(12) United States Patent
Zhang et al.

(10) Patent No.: US 12,744,564 B2
(45) Date of Patent: Sep. 22, 2026

(54) SYSTEMS, DEVICES AND METHODS FOR SCHEDULING WIRELESS COMMUNICATIONS

(71) Applicant: Intel Corporation, Santa Clara, CA (US)

(72) Inventors: Xin Zhang, Shanghai (CN); Di Liu, Beijing (CN)

(73) Assignee: Intel Corporation, Santa Clara, CA (US)

( * ) Notice: Subject to any disclaimer, the term of this patent is extended or adjusted under 35 U.S.C. 154(b) by 88 days.

(21) Appl. No.: 18/562,844

(22) PCT Filed: Dec. 24, 2021

(86) PCT No.: PCT/CN2021/141187

§ 371 (c)(1),
(2) Date: Nov. 21, 2023

(87) PCT Pub. No.: WO2023/115534

PCT Pub. Date: Jun. 29, 2023

(65) Prior Publication Data

US 2024/0291527 A1 Aug. 29, 2024

(51) Int. Cl.
*H04B 7/0452* (2017.01)
*H04B 7/06* (2006.01)

(52) U.S. Cl.
CPC ........... *H04B 7/0452* (2013.01); *H04B 7/063* (2013.01); *H04B 7/0632* (2013.01); *H04B 7/0639* (2013.01)

(58) Field of Classification Search
CPC .......... H04B 7/02; H04B 7/04; H04B 7/0413; H04B 7/0452; H04B 7/0621;
(Continued)

(56) References Cited

U.S. PATENT DOCUMENTS

2011/0176519 A1 7/2011 Vitthaladevuni et al.
2014/0254517 A1 9/2014 Nam et al.
(Continued)

FOREIGN PATENT DOCUMENTS

CN 104854902 A 8/2015
WO WO-2017108075 A1 * 6/2017 ........... H04B 7/0452

OTHER PUBLICATIONS

Huang et al., "Joint QoS-Aware Scheduling and Precoding for Massive MIMO Systems via Deep Reinforcement Learning", Apr. 9, 2021, arxiv.org, https://doi.org/10.48550/arXiv.2104.04492, pp. 1-12 (Year: 2021).*

(Continued)

*Primary Examiner* — Paul H. Masur
(74) *Attorney, Agent, or Firm* — Viering, Jentschura & Partner mbB

(57) ABSTRACT

Processing circuitry for a communication station configured to facilitate multi-user multiple-input multiple output (MU-MIMO) service. The processing circuitry can perform a multi-user selection for data transmission on a shared radio resource from a plurality of User Equipments (UEs). The processing circuitry selects one or more of the plurality of candidate UEs in time domain based on time-domain scheduling algorithm, obtain historical throughput data and input for each selected UE. The input includes a channel state indicator including a single-user channel quality indicator (SU-CQI), a precoding matrix indicator (PMI), rank indicator, and a channel state matrix. A trained reinforcement learning agent (RL agent) using the obtained input infers a rating score for each of the plurality of UEs. The processing circuitry schedules the one or more the UEs for transmission respectively on the plurality of radio resources based on the plurality of score ratings and allocate the plurality of radio resources.

19 Claims, 12 Drawing Sheets

(58) Field of Classification Search
CPC ..... H04B 7/0632; H04B 7/0639; H04L 5/003; H04L 5/0023; H04L 5/0057; H04L 5/0091; H04L 5/0094; H04W 72/50; H04W 72/54; G06N 20/00
See application file for complete search history.

(56) References Cited

U.S. PATENT DOCUMENTS

2015/0327246 A1 11/2015 Kim et al.
2019/0110306 A1* 4/2019 Bertrand ............. H04W 72/542

OTHER PUBLICATIONS

Guo et al., "A Novel User Selection Massive MIMO Scheduling Algorithm via Real Time DDPG", Dec. 7-11, 2020, IEEE, Globecom 2020—2020 IEEE Global Communications Conference, DOI: 10.1109/GLOBECOM42002.2020.9322383, pp. 1-6 ( Year: 2020).*

Manini et al., "Efficient System Capacity User Selection Algorithm in MU-MIMO", Apr. 25-28, 2021, IEEE, 2021 IEEE 93rd Vehicular Technology Conference (VTC2021-Spring), DOI: 10.1109/VTC2021-Spring51267.2021.9448632, pp. 1 (Year: 2021).*

"Convolution arithmetic", retrieved from https://github.com/vdumoulin/conv_arithmetic/blob/master/README.md on Feb. 26, 2024, 4 pages.

Qualcomm Incorporated, "Discussion on interference measurement enhancements", 3GPP TSG-RAN WG1 #86bis, Oct. 2016, retrieved from https://www.3gpp.org/dynareport?code=TDocExMtg--R1-86b--31664.htm on Nov. 9, 2023, 4 pages.

Kim, Taehyoung et al., "Multiuser CQI Prediction Based on Quantization Error Feedback for Massive MIMO Systems", International Workshop on Emerging MIMO Technologies with 2D Antenna Array for 4G LTE-Advanced and 5G, IEEE, Feb. 2015, pp. 32-36.

Futurewei, "Functional Framework for RAN Intelligence to support different learning problems", 3GPP TSG RAN WG3 Meeting #112-e, May 2021 retrieved from https://www.3gpp.org/dynareport?code=TDocExMtg--R3-112-e--39327.htm on Nov. 9, 2023, 10 pages.

International Search Report for corresponding International Patent Application No. PCT/CN2021/141187, dated Aug. 17, 2022, 4 pages (for informational purposes only).

* cited by examiner

100

Prior Art

200

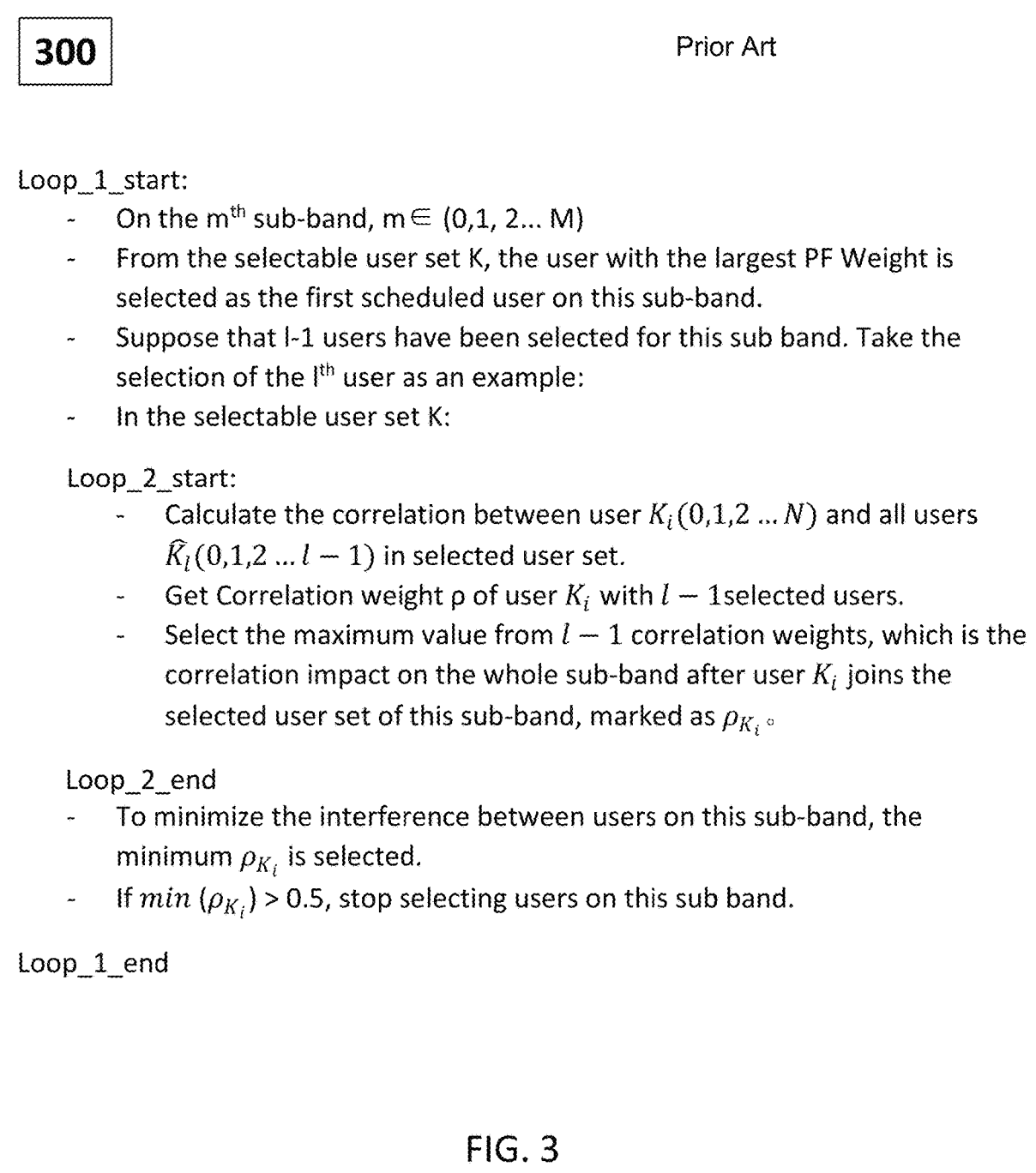

300

Prior Art

Loop_1_start:

- On the m^th sub-band, m ∈ (0,1, 2... M)
- From the selectable user set K, the user with the largest PF Weight is selected as the first scheduled user on this sub-band.
- Suppose that l-1 users have been selected for this sub band. Take the selection of the l^th user as an example:
- In the selectable user set K:

Loop_2_start:

- Calculate the correlation between user $K_i(0,1,2 \ldots N)$ and all users $\widehat{K}_l(0,1,2 \ldots l-1)$ in selected user set.
- Get Correlation weight ρ of user $K_i$ with $l-1$selected users.
- Select the maximum value from $l-1$ correlation weights, which is the correlation impact on the whole sub-band after user $K_i$ joins the selected user set of this sub-band, marked as $\rho_{K_i}$。

Loop_2_end

- To minimize the interference between users on this sub-band, the minimum $\rho_{K_i}$ is selected.
- If $min\ (\rho_{K_i})$ > 0.5, stop selecting users on this sub band.

Loop_1_end

FIG. 3

Prior Art

400

SYSTEMS, DEVICES AND METHODS FOR SCHEDULING WIRELESS COMMUNICATIONS

RELATED APPLICATION(S)

This application is a US National Stage Application of International Application PCT/CN2021/141187, filed on 24 Dec. 2021, the contents of which are incorporated herein by reference in their entirety.

TECHNICAL FIELD

Various aspects of this disclosure generally relate to systems, devices, and systems for scheduling wireless communications.

BACKGROUND

The increase of use and demand of Fifth Generation (5G) services increase the requirement of higher utilization of network spectrum. To increase the efficiency, Multi-user, Multiple-input, Multiple-output (MU-MIMO) is a key feature in a Medium Access Control (MAC) scheduler by avoiding mutual interference in the same time frequency resource slot.

FIG. 1 shows a framework of the traditional MAC scheduler 100. As shown, the MAC scheduler 100 can be divided into a time-domain scheduling for a set of users/UEs or candidates to be scheduled, candidate set 0 or "CS0") and CS1. The MAC scheduler further includes a frequency-domain scheduling CS2.

In general, there can be three stage of scheduling by a MAC scheduler, a first candidate sets CS0/CS1 can be selected users for time-domain scheduling and candidate set CS2 selected for frequency-domain scheduling.

The CS0 or time-domain scheduling includes at 100 updating Proportional Fairness (PF) weights for PF algorithm and for at 110 a PF pre-selection is implemented.

For frequency domain scheduling, the MAC scheduler 100 includes at 130 a user selection for assigning UEs to transmission channels (e.g., radio resources) using Correlation-based User Selection. Further the MAC scheduler 100 further uses MU-SINR at 140, such as by calculation by using zero force (ZF). At 150, the MAC scheduler calculates a modulation coding scheme (MCS) and a transport block (TB) size for each scheduled UE. Metrics are determined at 160, including PF throughputs that are fed back and used for to the time domain scheduling aspect.

In one example, assuming a group of users (UEs) located around or in the vicinity of a base station (BS), the BS will provide service to the group of UEs at the same time in a MU-MIMO system. That is, the BS allocates radio resources for these UEs to transmit data. The radio resource can have two dimension, a time-domain dimension (e.g., when to transmit) and a frequency-domain dimension (e.g., which carrier to transmit). Accordingly, in scheduling for CS0 and CS1, the MAC scheduler 100 determines which candidates have opportunities to transmit in time-domain and for CS2 determines in which carrier to transmit data.

In first scheduling for CS0/1, not all of the group of users, may get the service from the BS at the same time due to capability limitations. Hence, the BS can choose a subset of the group of UEs to provide service and then serve the others or rest at a next time. For this policy selection, PF is used in which each user has a PF weight (score) and the BS will serve the UEs with highest PF weights. The PF algorithm could guarantee every user could get service given users' channel condition and their resource requirement. In short, PF weight is a score indicating the priority, PF pre-selection is BS will serve UEs group by group.

For frequency domain scheduling 130, BS will allocate the detailed carriers to users for data transmission. After time and frequency-domain resource are determined for a certain group of UEs, then BS will calculate their MU-MIMO gain or (MU-SINR) at 140. MU-MIMO takes into account that when transmitting data for multiple users at the same time, there is mutual interference between UEs'.

After that, the BS will calculate TBsize(throughput) 150 for each UE to check whether the users' requirement have been satisfied. And according to checking result, BS will update users' scores (PF weight) for next round of scheduling at 160.

Various algorithms can be used for frequency-domain scheduling to achieve the target for increasing network spectrum efficiency and decreasing the latency to protect the minimum bit rate. A traditional user selection algorithm in time sensitive 5G New Radio (NR) framework can take up huge workload and be difficult due to scale the complexity of algorithm needed to achieve higher throughput.

CUS (Correlation-based User Selection) is a known algorithm that only calculates correlations without considering multiuser channel quality indicator (MU-CQI) in a MU-MIMO system. Nevertheless, CUS can still occupy up to 65% of a base station e.g., Evolved Node B (eNB) downlink scheduling workload.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects of the invention are described with reference to the following drawings, in which:

FIG. 3 shows pseudo code to implement a traditional algorithm correlation-based user selection (CUS) algorithm.

DESCRIPTION

Figure 1:
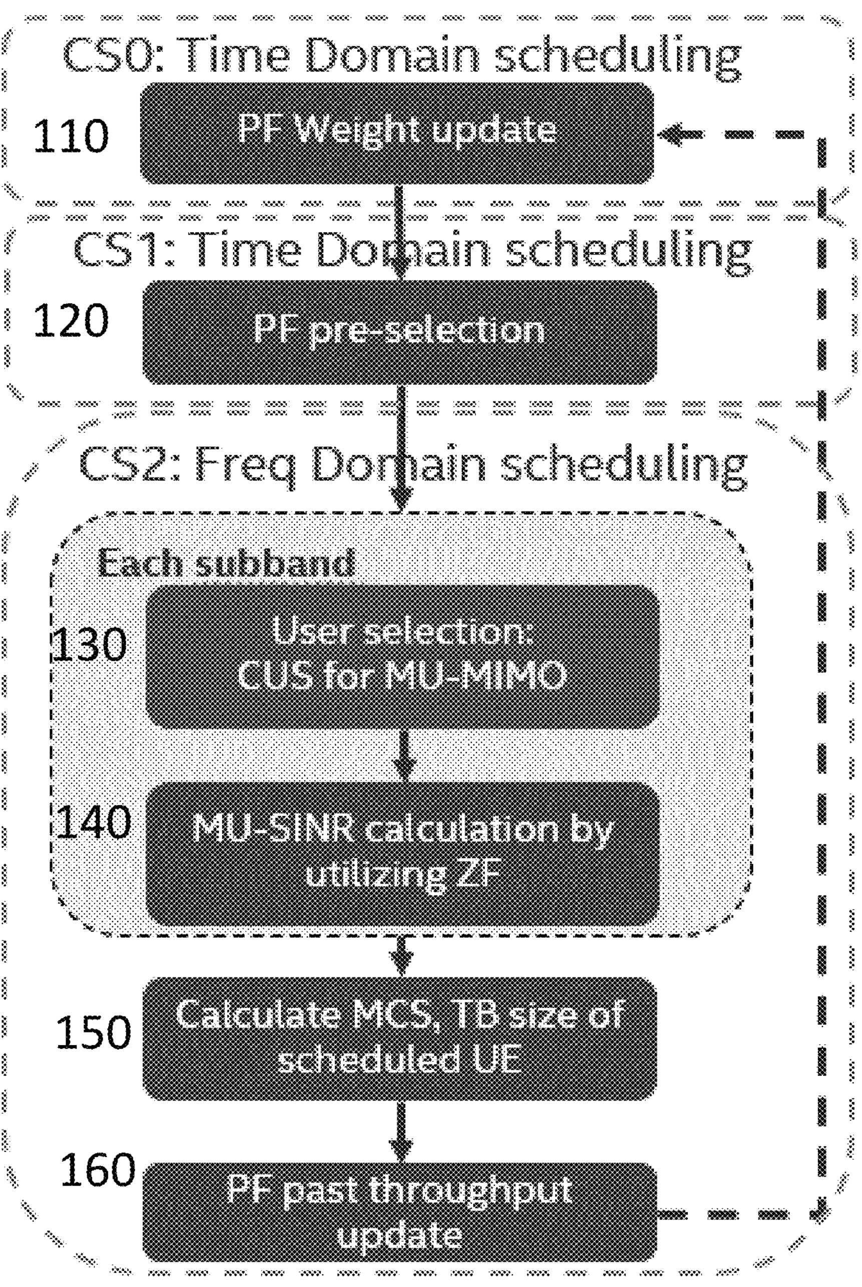
FIG. 1 shows a diagram of a MAC scheduler.

The following detailed description refers to the accompanying drawings that show, by way of illustration, exemplary details and aspects in which the invention may be practiced.

The word "exemplary" is used herein to mean "serving as an example, instance, or illustration". Any aspect or design described herein as "exemplary" is not necessarily to be construed as preferred or advantageous over other aspects or designs.

Throughout the drawings, it should be noted that like reference numbers are used to depict the same or similar elements, features, and structures unless otherwise noted.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The words "plural" and "multiple" in the description and the claims expressly refer to a quantity greater than one. Accordingly, any phrases explicitly invoking the aforementioned words (e.g., "plural [elements]", "multiple [elements]") referring to a quantity of elements expressly refers to more than one of the said elements. The phrases "group (of)", "set (of)", "collection (of)", "series (of)", "sequence (of)", "grouping (of)", etc., and the like in the description and the claims, if any, refer to a quantity equal to or greater than one, i.e., one or more. The phrases "proper subset", "reduced subset", and "lesser subset" refer to a subset of a set that is not equal to the set, illustratively, referring to a subset of a set that contains fewer elements than the set.

The phrase "at least one of" with regard to a group of elements may be used herein to mean at least one element from the group, including the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in the form of a pointer. However, the term "data" is not limited to the examples mentioned above and may take various forms and represent any information as understood in the art.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit, and may also be referred to as a "processing circuit," "processing circuitry," among others. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality, among others, and conversely that any single processor, controller, or logic circuit described herein may be realized as two (or more) separate entities with equivalent functionality, among others.

As utilized herein, terms "module", "component," "system," "circuit," "element," "slice," "circuitry," and the like are intended to refer to a set of one or more electronic components, a computer-related entity, hardware, software (e.g., in execution), and/or firmware. For example, circuitry or a similar term can be a processor, a process running on a processor, a controller, an object, an executable program, a storage device, and/or a computer with a processing device. By way of illustration, an application running on a server and the server can also be circuitry. One or more circuits can reside within the same circuitry, and circuitry can be localized on one computer and/or distributed between two or more computers. A set of elements or a set of other circuits can be described herein, in which the term "set" can be interpreted as "one or more."

As used herein, "memory" is understood as a computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory. The term "software" refers to any type of executable instruction, including firmware.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "send," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the processors or controllers perform the logical transmission and reception over the software-level connection. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

As used herein, a signal that is "indicative of" a value or other information may be a digital or analog signal that encodes or otherwise communicates the value or other information in a manner that can be decoded by and/or cause a responsive action in a component receiving the signal. The signal may be stored or buffered in a computer-readable storage medium prior to its receipt by the receiving component. The receiving component may retrieve the signal from the storage medium. Further, a "value" that is "indicative of" some quantity, state, or parameter may be physically embodied as a digital signal, an analog signal, or stored bits that encode or otherwise communicate the value.

As used herein, a signal may be transmitted or conducted through a signal chain in which the signal is processed to change characteristics such as phase, amplitude, frequency, and so on. The signal may be referred to as the same signal even as such characteristics are adapted. In general, so long as a signal continues to encode the same information, the signal may be considered as the same signal. For example, a transmit signal may be regarded as referring to the transmit signal in baseband, intermediate, and radio frequencies.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Figure 2:
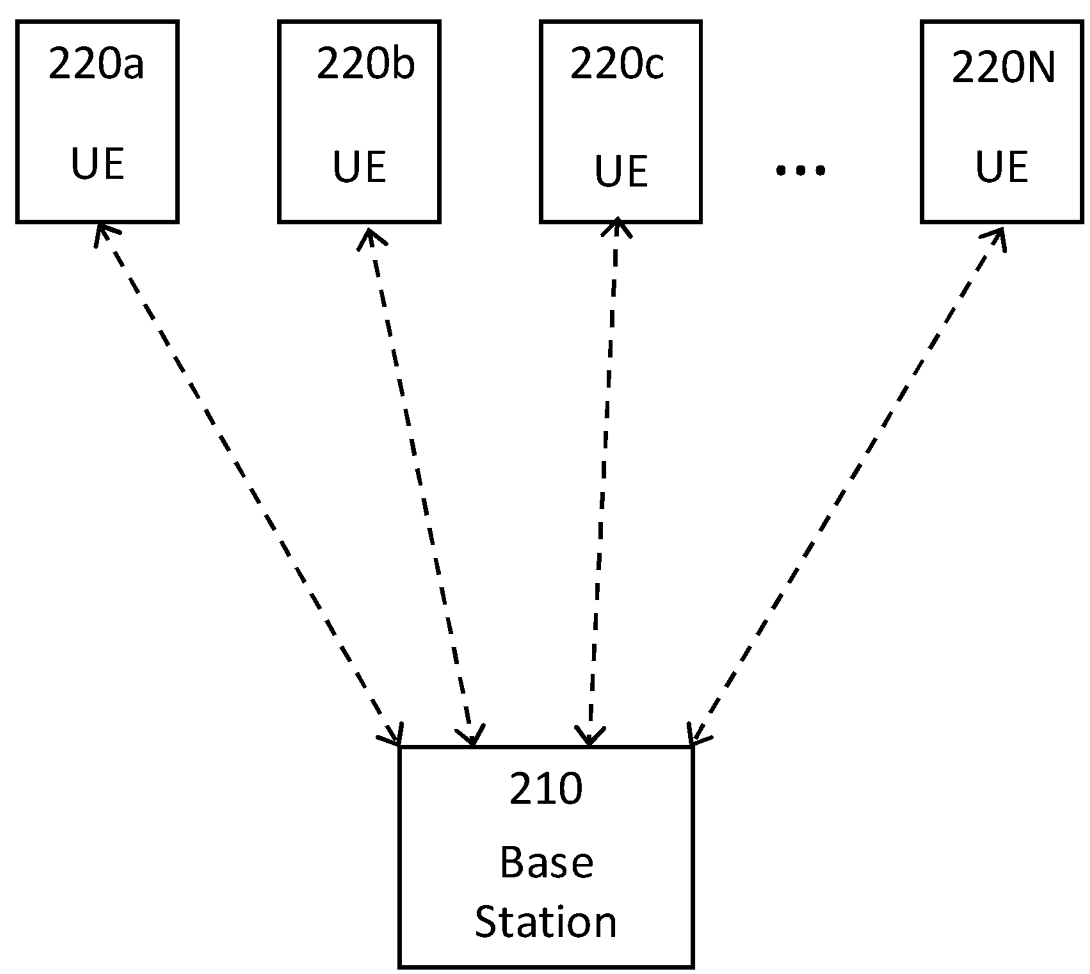
FIG. 2 is a block diagram of environment showing a plurality of user equipments (UEs) that communicative with a base station.

FIG. 2 shows an exemplary diagram illustrating an environment 200 including User Equipments 220 (UEs computing devices 220*a*-N) or mobile stations that are configured to communicate wirelessly. The UEs 220 may include at least one processing circuit and at least one wireless communication circuit that implement one or more of various types communications protocols. For example, protocols can include Long Term Evolution (LTE), including (LTE-Advanced (LTE-A); LTE-Unlicensed (LTE-U)); 3G; 3G, 4G, 5G, or any other suitable wireless communication protocol or radio frequency based network protocol. In particular, the UEs 220 can communicate according to 5G and MU-MIMO.

The UEs 220 can be a computing devices such as a smartphone, a tablet device, a desktop or personal computer, a mobile phone, a laptop, a netbook computer, a workstation, a server, a mobile medical device, a camera, a wearable device, an Internet-of-Things (IoT) device, etc.

Further, the UEs can communicate via the base station 210. The base station 210 can provide communication services to the UEs using one or more cellular protocols. In general, in the present disclosure, "access point (AP)", "wireless access point (WAP)", "base station," "base transceiver station", "Node B", "evolved Node B (eNode B or eNB)", (gNodeB or gNB), and similar terminology, may be utilized interchangeably in the present disclosure, and refer to a wireless network component or apparatus that serves and receives data, control, voice, video, sound, gaming, or substantially any data-stream or signaling-stream from a set of wireless devices.

The base station 210 and the UEs 220 may operate according to a MU-MIMO scheme. MU-MIMO is a radio communication technique using a transmitter and receivers that each have multiple antennas to wirelessly communicate with one another. Using multiple antennas at the transmitter and receivers allows the spatial dimension to be applied to improve the performance and throughput of a wireless link. MU-MIMO allows multiple UEs to share the same resource in e.g. frequency and time domains. For MU-MIMO, a base station may select and schedule a set of UEs for a data transmission with MU-MIMO.

Accordingly, the UEs and base stations described herein can include multiple antennas and multiple which their respective transmitters and receivers use.

FIG. 3 shows an exemplary pseudo code 300 that when executed, implements a traditional algorithm correlation-based user selection (CUS) algorithm. Code or program instructions equivalent to the pseudo code 300 can be executed by one or more processors or computing devices of a base station, such as base station 210 of FIG. 2.

Traditional CUS implemented by a base station can be used to select users or UEs to transmit, for example, with a minimum channel correlation and provide certain services. Hence, the code 300 implementing the CUS and DDPG algorithm can be used by a base station for selection and scheduling UEs for transmission in a MU-MIMO scheme.

Figure 4:
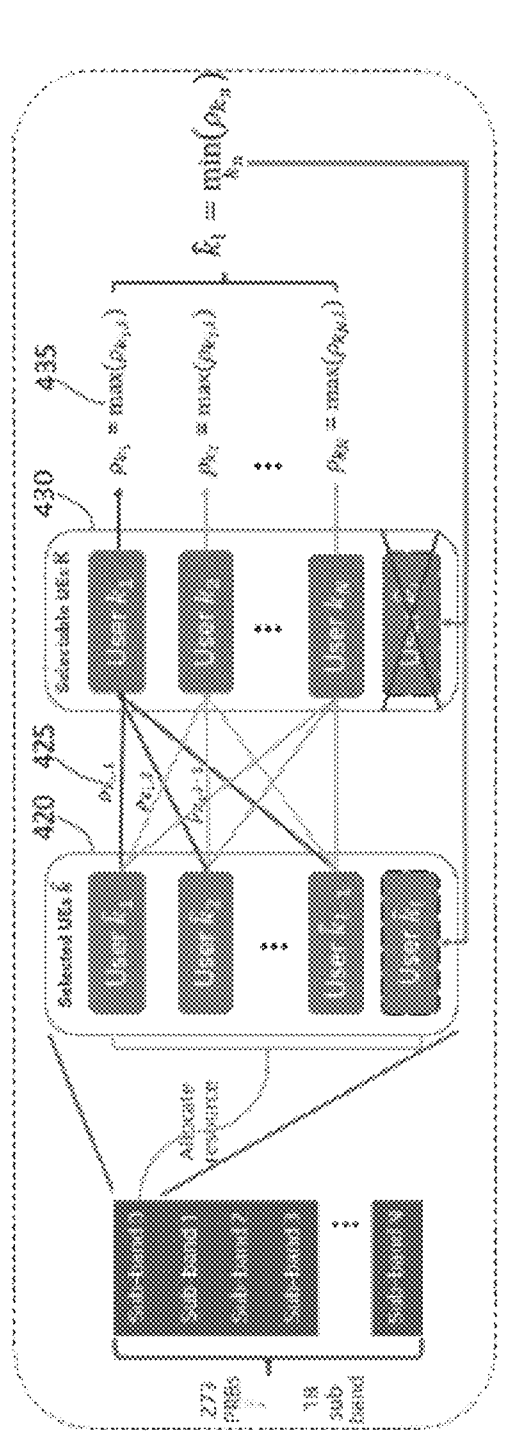
FIG. 4 shows a representation of one example of CUS algorithm being implemented. shows another diagram of a MAC scheduler.

FIG. 4 shows a visual representation 400 of an example of CUS algorithm 300 being implemented, for example, in the context of FIG. 2. Further, in such an example, the base station 210 may implement the CUS algorithm 400 for selecting UEs in the context of a MU-MIMO scheme. In this figure, the selected user equipments (UEs) are depicted as 420, and the selectable user set is depicted as 430. As seen in FIG. 3, the correlation between a user of the selected user equipments 420 and each of these UEs in the selected UEs 430 is calculated. A correlation weight p of the user with the selected users is obtained. The maximum weight 435 is then selected.

Figure 5:
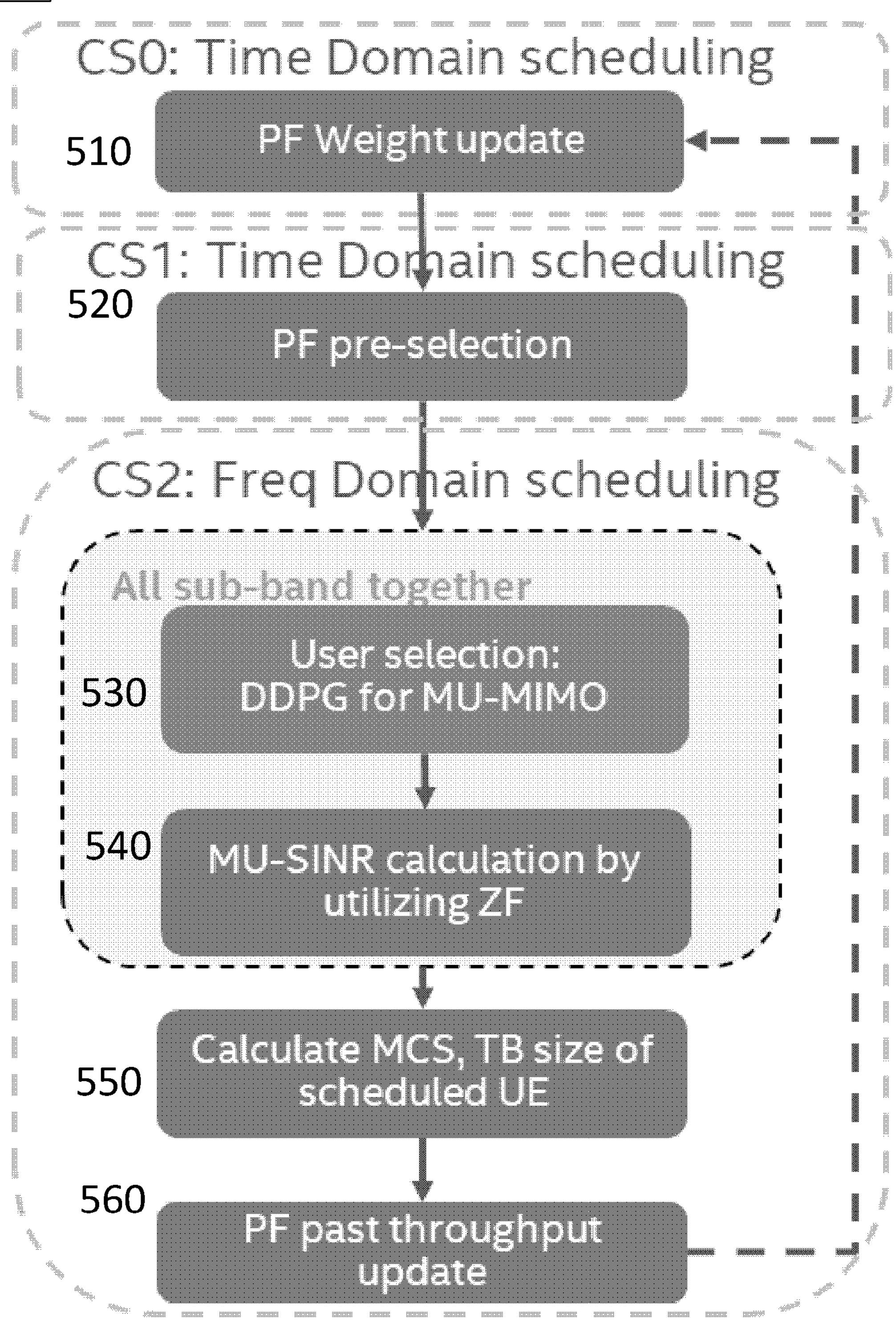

FIG. 5 shows another framework for the traditional MAC scheduler 500 which implements user selection using a traditional DDPG. The MAC Scheduler 500 implements similar actions 510-560 as the actions 110-160 of Mac Scheduler 100. However, the MAC scheduler 500 differs from the MAC scheduler 100 of FIG. 1 in that MAC scheduler 500 can allocate or schedule all sub-bands at once using a traditional DDPG algorithm at step 530. That is, the user selection process of MAC scheduler 500 selects schedulable users on multiple sub-bands in each slot according to the status of selected users to achieve the best system performance using DDPG. Again, DDPG is a policy-based reinforcement learning algorithm for continuous behavior, so this algorithm can match this scenario well.

Figure 6:
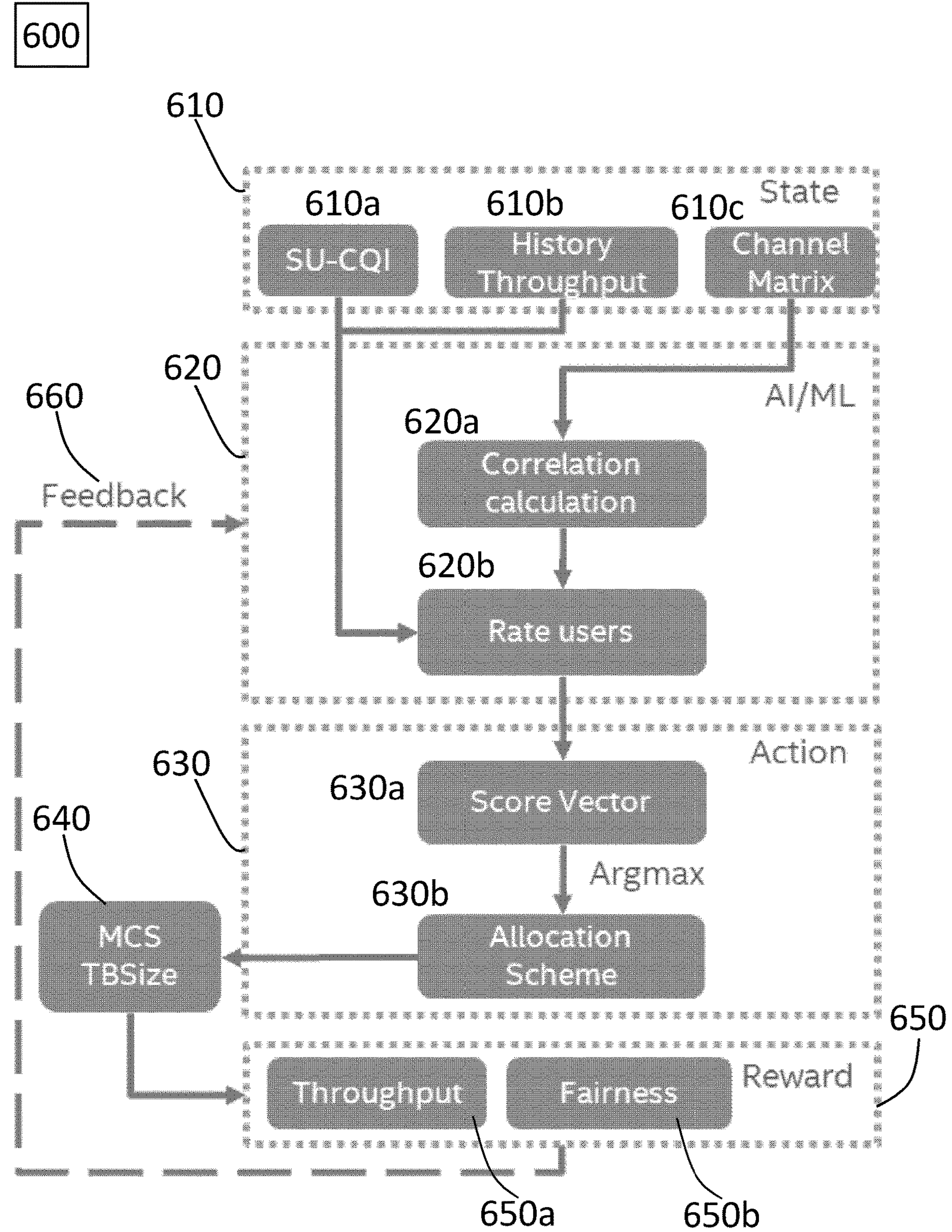
FIG. 6 shows an artificial intelligence/machine learning (AI/MI) framework or flow diagram for implementing a traditional DDPG algorithm used for user selection.

FIG. 6 shows a further artificial intelligence/machine learning (AI/MI) framework 600 for a traditional DDPG algorithm used for user selection. The framework 600 for DDPG algorithm can be divided into two parts, one is the AIML framework based on DDPG, the other is the MU-MIMO user selection algorithm based on CUS.

As shown, at 610 the single-user channel quality indicators (SU-CQIs) are determined or obtained for each user 610*a*, the history throughput of the users is obtained, 610*b*, and the channel state matrix for each user is obtained or determined, 610*c*. First, matrix operations are implemented which replace the complicated mathematical calculation of CUS to complete the correlation calculation.

From the state information obtained at 610, a AI/ML entity 620 (e.g., implemented by base statin) implements CUS algorithm to determine a correlation calculation 620*a* which is used to score or rate each user at 620*b*. That is, a scoring table can be produced in which the users are selected in the order of scores from largest (e.g., highest) to smallest (e.g. lowest).

After the AI/ML determines the user scores, one or more actions 630 can be taken which include using a score vector, 630*a*. For example, the scale of SU-CQI can be [0-15], and throughput can be [0-7 Gbps], and correlation between users [0-1]. Accordingly, a score vector can be needed here to normalize the score rating values. Thus the produced score vector can functions to generate a final score of each UE in each radio resource (e.g., sub-band) given SU-CQI, throughput and correlation all together.

Based on the score vector, an allocation scheme can be assigned to each user at 630*b*, in which frequency-domain resources are allocated to users or UEs, using DDPG.

After taking the actions 630, the base station can calculate the modulation coding scheme (MCS) transport block size (MCS TbSize) at 640 for the scheduled and allocated users. Based on the transmission from the allocated and scheduled users, evaluation actions 650 can be determined. That is, evaluation of the throughput at 650*a* and fairness 650 of the system can be determined. The throughput (e.g., scale/range of 0-7 Gbps) and Fairness (e.g., scale/range 0-1) at 650 can be normalized using a mathematical method. The feedback 620 can be a number with scale of (0,1)

Data regarding such evaluations can be produced and returned as rewards to the AIML 620 entity as scheduling experience in the next scheduling to make the scheduling more accurate.

CUS is essentially a greedy algorithm, which therefore has a high degree of complexity and is computationally intensive. Accordingly, the complexity degrades the wireless performance of using. In general, enhancement of wireless performance increases the computational burden and thus leading to a higher CPU occupancy ratio.

Similarly, traditional DDPG algorithms present disadvantages because all sub-bands of radio resources (also called radio resource units) are processed uniformly without consideration of a user or UE's time dimension. With the progress of scheduling, the scheduling priority and resource usage of UE in each sub-band are different, which will lead to great waste of resources and unnecessary computational complexity in CCE allocation. Although the complexity of user selection is reduced, the complexity of resource judgment in frequency domain is aggravated.

Current efforts to reduce the complexity of DDPG include or involve not calculating every correlation between every two users when using the matrix to calculate the correlation. Further, the DDPG algorithm considers the influence of SU-CQI and historical throughput on the system, which is only a simple superposition. After the user reports the SU-CQI, DDPG directly uses this value without considering the MU-MIMO gain. Further, many current approaches using DDPG algorithm cannot be well integrated into a wireless protocol stack.

Figure 7:
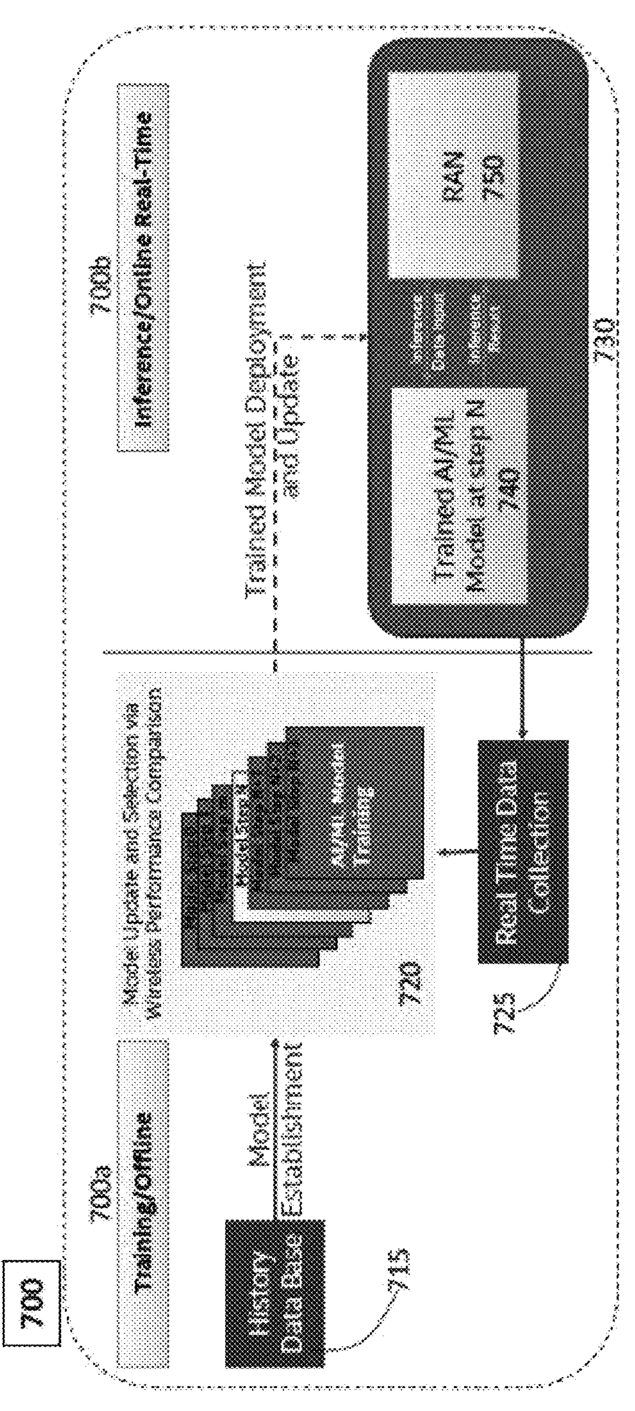
FIG. 7 shows a diagram of a system or framework for implementing a user selection using a modified DDPG algorithm according to at least one exemplary embodiment of the present disclosure.

FIG. 7 shows a system or framework 700 for implementing a user selection using a modified DDPG algorithm according to at least one exemplary embodiment of the present disclosure. The system or framework 700 can allow a base station (base station 220 of FIG. 2) to select and assign users to sub-bands according to a MU-MIMO scheme.

The framework 700 can implement a DDPG user selection algorithm that implements reinforcement learning to reduce the computational complexity of traditional DDPG algorithm. As shown in FIG. 7, the framework 700 can include two aspects, a training component 700*a* and an inference or real-time online aspect 700b.

The training component 700*a* can be implemented using a suitable deep learning (DL) framework, such as Intel-TensorFlow® in one example. In general, the training component 700*a* can be implemented offline and not be time sensitive. As shown, the training component can include or access historical data from a historical or history database 715. The history database can be an electronic database include data indicating prior user selections, scheduling, as well as the corresponding metrics, e.g., throughput, CQIs, channel states, etc.

The history database 715, provides its data for training a user selection model 720. The user selection model 720 can be an artificial intelligence or machine learning model. As such, the user selection model can be software, e.g., the learning model can be in the form instructions and data stored on a non-transitory computer readable medium. The training component 700*a* includes one or more processors that can execute the instructions to implement the user selection model 720.

The training component 700*a* can be configured to update and train the model 720. As shown, in FIG. 7, there may be several iterations or steps (Step 0-Step N+3) needed to refine and train the model 720 to be suitable before being used or deployed, e.g., at a base station. In this example trained model at step N or nth iteration is deployed as the model 740 for use with a communication system 730. However, as real-time data is collected, an updated model, e.g., at step N+3, could be deployed if the channel conditions are determined to significantly changed requiring a more updated model.

After getting the best trained model in term of wireless performance, then this model will be deployed in a real-time wireless protocol stack. The DDPG algorithm obtains the input(s) needed from a real-time protocol stack, and then can provide or help provide a schedulable user set through an AIML inference.

When the channel conditions of users/UEs change, new real-time data can be collected, e.g., by the real-time data collection component 725. Using the new real-time data, a new or updated trained model 720 can be reestablished and then redeployed, e.g., to a communication or base station so as to be applied to a current cell scheduling scenario.

As shown in FIG. 7, a wireless communication system 730 can include a base station or radio access network (RAN) 750. Further, the communication system 730 includes the trained model. That is, the communication system includes processing circuitry (e.g., one or more processors) to implement the trained model 740. The processing circuitry can be coupled to wireless interfaces (e.g., RF interface) of the communication system. The trained model may be stored as instructions in a memory or any suitable computer-readable memory. As shown in the example of FIG. 7, the RAN 750 can provide inference data input, which can include a channel state indicator including a single-user channel quality indicator (SU-CQI), a precoding matrix indicator (PMI), and rank indicator (RI), and a channel state matrix for each of plurality of UEs.

Using the input, the trained model 740 provides interference result(s). That is, the trained model 740 can infer one or several results, e.g., determination or calculations. For example, the trained model may infer a score rating for each of one or more UEs. The score rating can be calculated with respect to a radio resource (used for transmission) with the score rating indicating the appropriates or suitability for a particular UE to transmit on a radio resource.

The trained model 740 can determine or infer the score rating for UEs based on one or more determination inferred or made by the trained model 740. For example, the trained model may determine a correlation calculation between the UEs for each of a plurality of radio resources using channel state matrices for each UE, determine: a multi-user channel quality indicator (MU-CQI) from the correlation calculation and obtained SU-CQIs, determine a multi-user scheduling benefits from the obtained SU-CQIs, determine a modulation and coding scheme (MCS) and a MCS transport block size (TBSize) based on the multi-user scheduling benefits, determine a model reward based on the calculated throughput from TBS and obtained historical throughput, and calculate the rating score for each of the plurality of UEs based on the correlation calculation, the MU-CQI, and the RL Agent reward.

The trained user selection model 740 can be realized in one of several ways. In one instance, the user selection model 740/720 can be implemented as an artificial neural network (ANN). The ANN can include a plurality of interconnected nodes arranges in several layers, e.g., an input layer, one or more intermediate layers, and an output layer. The input layer(s) can take input as described above. Some layers, e.g., intermediate layers may indicate several of the determination listed above, e.g. correlation determination/calculation, MU-CQI calculation/determination. An output or intermediate layer of the ANN can provide score ratings for UEs.

In other cases, the trained model may be machine learning model.

Figure 8:
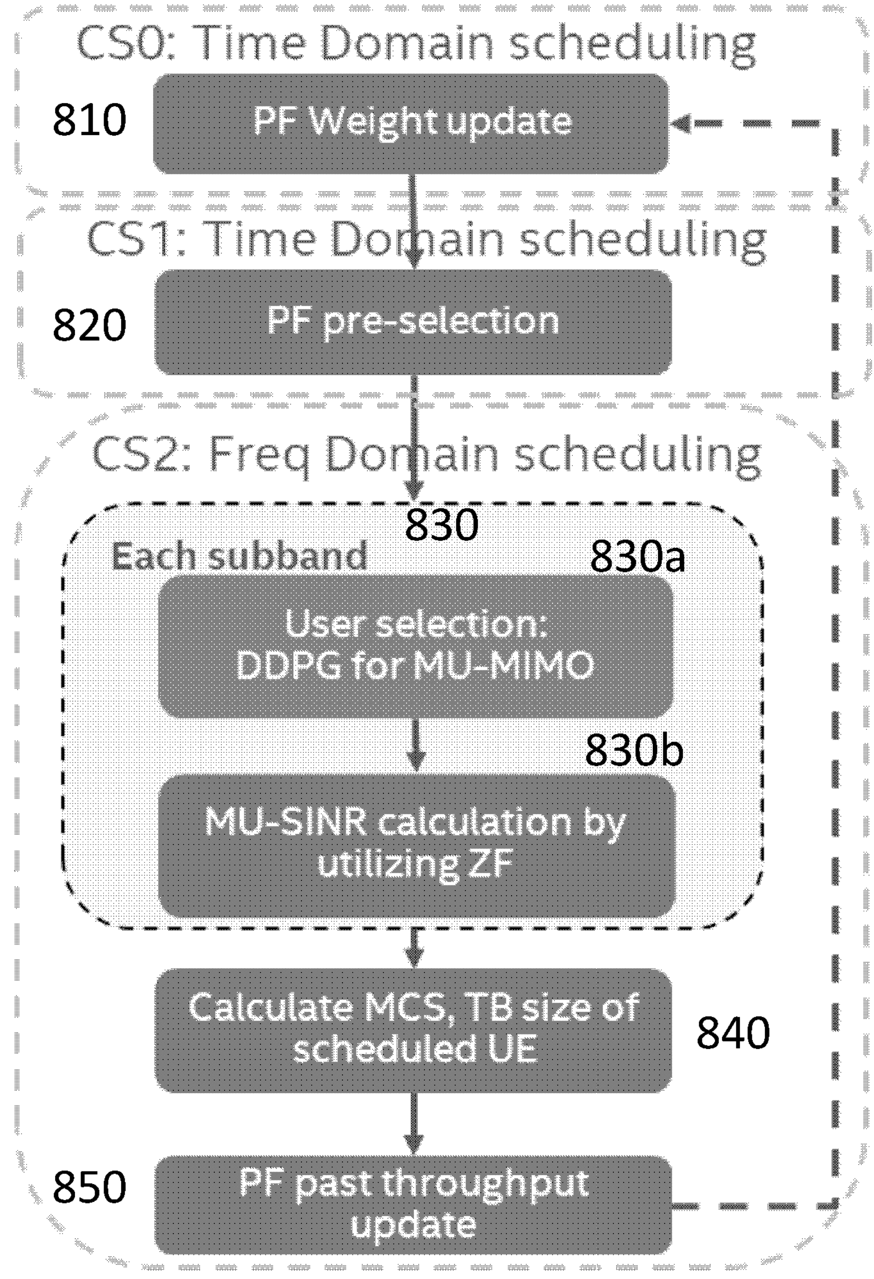
FIG. 8 shows a flow diagram for a MAC scheduler which implements artificial intelligence/machine learning (AIML) according to at least one exemplary embodiment of the present disclosure.

FIG. 8 shows a flow diagram for a MAC scheduler 800 which implements artificial intelligence/machine learning (AIML) according to at least one exemplary embodiment of the present disclosure. The actions or flow diagram implemented by the MAC scheduler 800 is similar to the MAC scheduler flow diagram 500 of FIG. 5, except that the user selection process 830 is performed and/or implemented differently from the user selection action 530. 830*a* shows user selection using DDPG for MU-MIMO, and 830*b* shows MU-SINR calculation by using zero-force (ZF).

Figure 9:
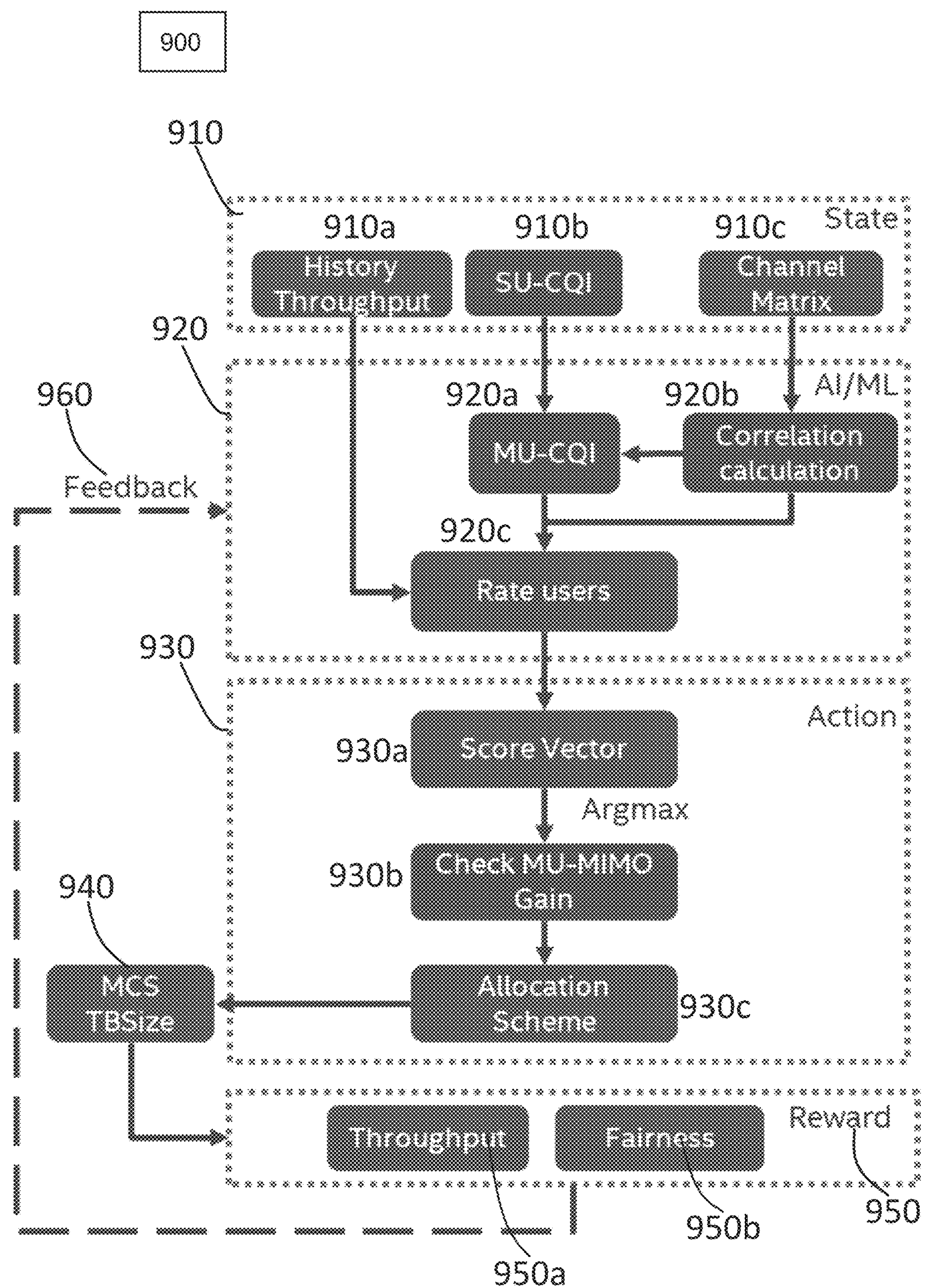
FIG. 9 shows a diagram or framework for the AIML used for the scheduler of FIG. 8.

FIG. 9 shows a corresponding framework 900 for the AIML for the scheduler 800 of FIG. 8. As shown, the inputs can be obtained at 910. At 910*a*, the single-user channel quality indicator (SU-CQI), a precoding matrix indicator (PMI), and rank indicator (RI) for each user can be obtained. At 910*b*, historical throughput data 910*b* for can be obtained. At 910*c* the channel matrix H can be obtained.

Using the AIML, (which can be implemented by processing circuitry of a communication/base station), a trained reinforcement learning agent (RL agent) implemented by the processing circuitry to infer or determine one or more MU-CQI for each of the UEs 920*a* and determine correlation between the UEs at 920*b*. Further, the AIML can further use the MU-CQI and the correlation calculation to infer further determinations. For example, AIML determines the rating scores for UEs at 920*c*.

In one example, in determining the rating scores further determination may be performed including determining multi-user scheduling benefits from the obtained SU-CQIs, determine a modulation and coding scheme (MCS) and a MCS transport block size (TBSize) based on the multi-user scheduling benefits, and determine a RL agent reward based on the calculated throughput from TBS and obtained historical throughput, and calculating a rating score for each of the plurality of UEs based on the correlation calculation, the MU-CQI, and the RL Agent reward.

The score vector or sorted score ratings 930*a* can be determined from the score ratings determined at 920*c* by the AIML, the UEs can be scheduled to radio resource units (e.g., sub-bands). Further, the MU-MIMO gain at 930*b* can be determined as the UEs are being assigned to radio resource units and may depending on the impact, may be removed from assignment or reassigned. After being allocated at 930*c*, the communication or base station can determine MCS TBSize.

Based on the transmission performed by the UEs, a AIML reward can be determined at 950, which can be based on determining throughput indicators 950*a* and fairness indicators at 950*b*. The reward 950 can be provided to the AIML and used for inference of the score ratings.

In short, for each radio resource (e.g., sub-band) to which UEs can be scheduled or assigned to for transmission according to MU-MIMO scheme, a the DDPG algorithm is implemented using AIML to assign the UEs to a radio resource or a radio resource unit together using (sorted) score ratings. The sorted ranking scores can be inferred as described herein.

The modified DDPG algorithm can reduce scheduling granularity by taking scheduling priority of UEs/users in different sub-bands and buffer statuses of users into consideration and thus can save system resources to make scheduling fairer.

The modified DDPG algorithm determines a correlation between UEs/users and uses the SU-CQI (reported by UEs) to derive or determine a MU-CQI, the formula is as below:

$$MU_{CQI} = \frac{1}{M} * \frac{1}{\frac{1}{su_{CQI}} + \max \vartheta_{i,j}^2}$$

where $$\max\vartheta_{i,j}^2$$

is the maximum value of correlation weight between a user i and all the other users (the other users are represented by j).

Accordingly, the determined MU-CQI can be used to consider a multi-user channel gain for scheduling.

Further, in some embodiments, restrictions for UEs may be added to improve user/UE selection. For example, the user-selection algorithm or process can check the MU-MIMO gain of each UE, after adding a next UE to a current sub-band. If the gain (MU-MIMO gain) of the system decreases, then stop selecting the user. That is, the next user can be removed or re-assigned, e.g., to another radio resource or sub-band. Thus, wireless performance degradation caused by selection of UEs with a negative impact can be avoided.

Further, the score rating inference can be performed on a real-time basis and be implemented in a real-time wireless protocol stack of a communication station, e.g., base station.

Figure 10:
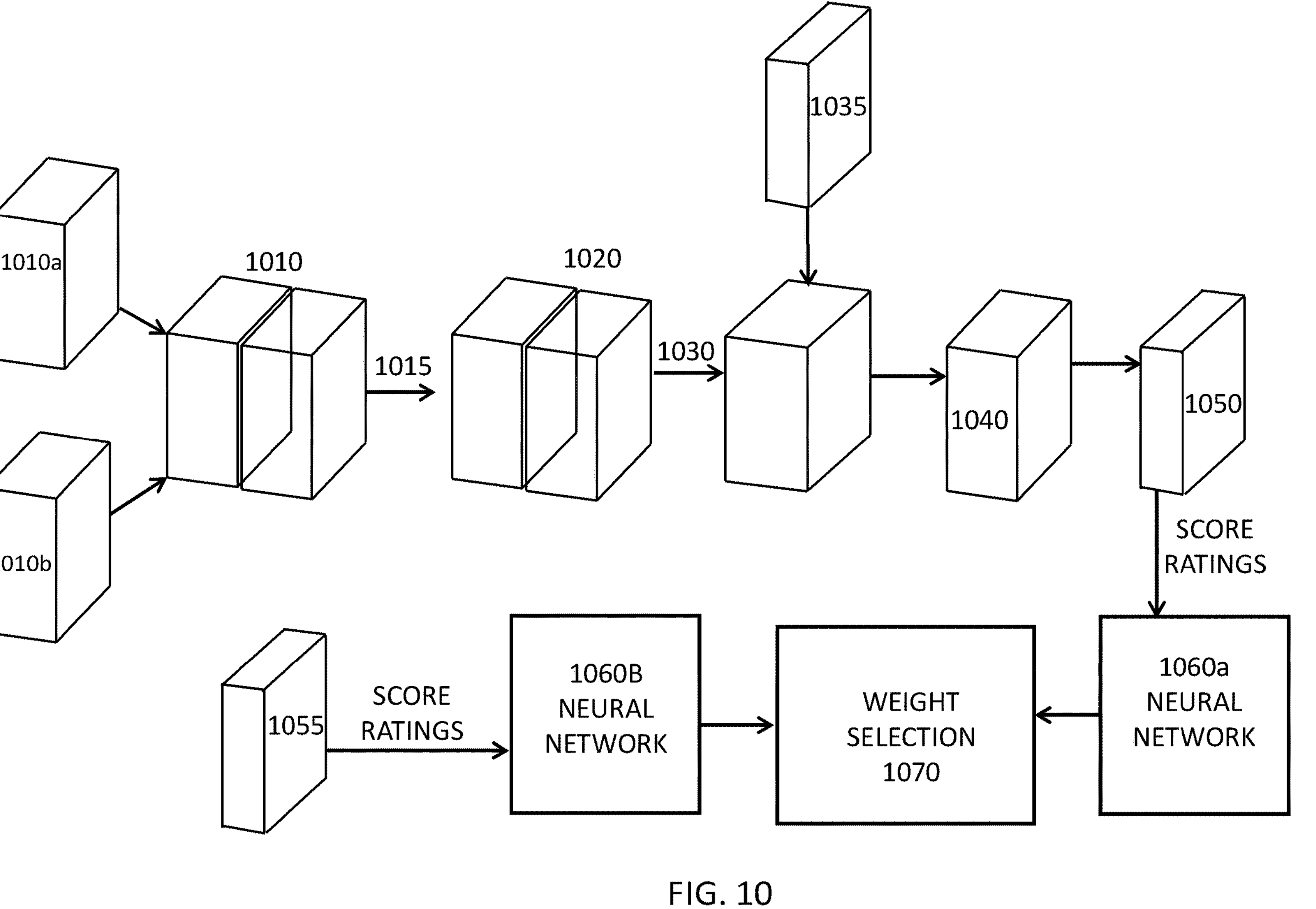
FIG. 10 shows a visual flow diagram showing a process for training a AIML according to exemplary embodiments of the present disclosure.

FIG. 10 shows a visual flow diagram showing a process for training a AIML used herein. The training may include using historical or data calculated from a communication or base station. The data may include a score rating for each of the group of UEs, channel matrix for each of the group of UEs, and transmission throughput for each of the group of UEs.

The training may include providing channel matrix 1010 which includes both a combined imaginary part 1010*a* and the real part 1010*a* of a channel matrix 1010. In the training, the channel matrix is processed according to a user scoring table (sorted score ratings) obtained from a last or previous inference. For example, the channel matrix can be processed at 1015 so that the resulting processed channel matrix 1020 will retain the channel characteristics of users with high scores and erase the information of users with low scores.

Then from the processed channel matrix 1020, the matrix 1030 for each radio resource/radio resource unit (e.g., sub-band) can be multiplied by the conjugate transpose 1035 to produce an interference or correlation matrix 1040. The correlation matrix then can be used to convert the SU-CQIs to MU-CQIs 1050.

Then the MU-CQIs 1050 and the historical throughput 1055 are multiplied by score ratings respectively producing a filtered MU-CQI and filtered throughput which respectively input through a neural networks 1060*a* and 1060*b*. Each neural network comprising an activation layer configured to normalized values for the MU-CQI and the throughput.

The purpose of the activation layer is to limit the value of MU-CQI and throughput in the range of (0,1), not to produces two weights. Since the range of MU-CQI and throughput are very different. For example, an example of activation function is sigmoid function (y=1/(1+e^(−x))), where x is input and y is output.

After normalizing the filtered MU-CQI and the filtered throughput, weights (WA for MU-CQI and WB for throughput) are selected for the RL agent at 1070. The weights can be related to find the reward according to the equations:

$$WA+WB=100 \text{ and}$$

$$WA*MU\text{-}CQI+WB*THROUGHPUT=\text{REWARD}.$$

Accordingly, the determined weights can be integrated or used by the RL training agent. That is, by adjusting the weights, the convolutions performed by the training RL agent using the weights is better configured to find the direction of getting or producing a maximum value of reward. The weight can be explored by the network itself, no need to set manually. For example, if throughput is desired as the dominant factor, then set, e.g., WB=0.9 as one example. If you want to take Multiple-user gain is desired as the leading factor then WA is set to a larger number or value.

In embodiments the rating score indicates a resource allocation schema (in one simple example the score of a UE/user who has resource to transmit is 1, and those without the resource is 0. Therefore, multiplying the score ratings or score rating matrix with MU-CQI can filter to indicate UEs who have resource to transmit (whose MU-CQI is not 0). The training agent could follow the resource allocation schema and to check whether is a good schema or not. Then feedback this judgement (the reward, if MU-CQI is 0, the reward for this user is 0) to inference for adjusting the weights and bias of inferencing network.

The purpose of the training can be to maximize the RL reward. To avoid the reward growing to infinity without stopping, (which will not allow the network to converge) is to add a "loss" before the reward which can be the negative of the reward (e.g., -reward). Thus, the upper of loss is 0. So, we can maximum reward in this method.

In general, the calculated reward takes throughput and fairness into consideration. Hence, the larger the reward, the better the BS could get the wireless performance. If the reward is so small, then the agent will know the current strategy to select users is not good, then trying to change the adjusting direction. If the reward is approaching to 1, then agent would keep the same direction to optimize the network. By determining to maximize reward the trained machine learning produces weights which can be used in implementing the RL agent.

Figure 11:
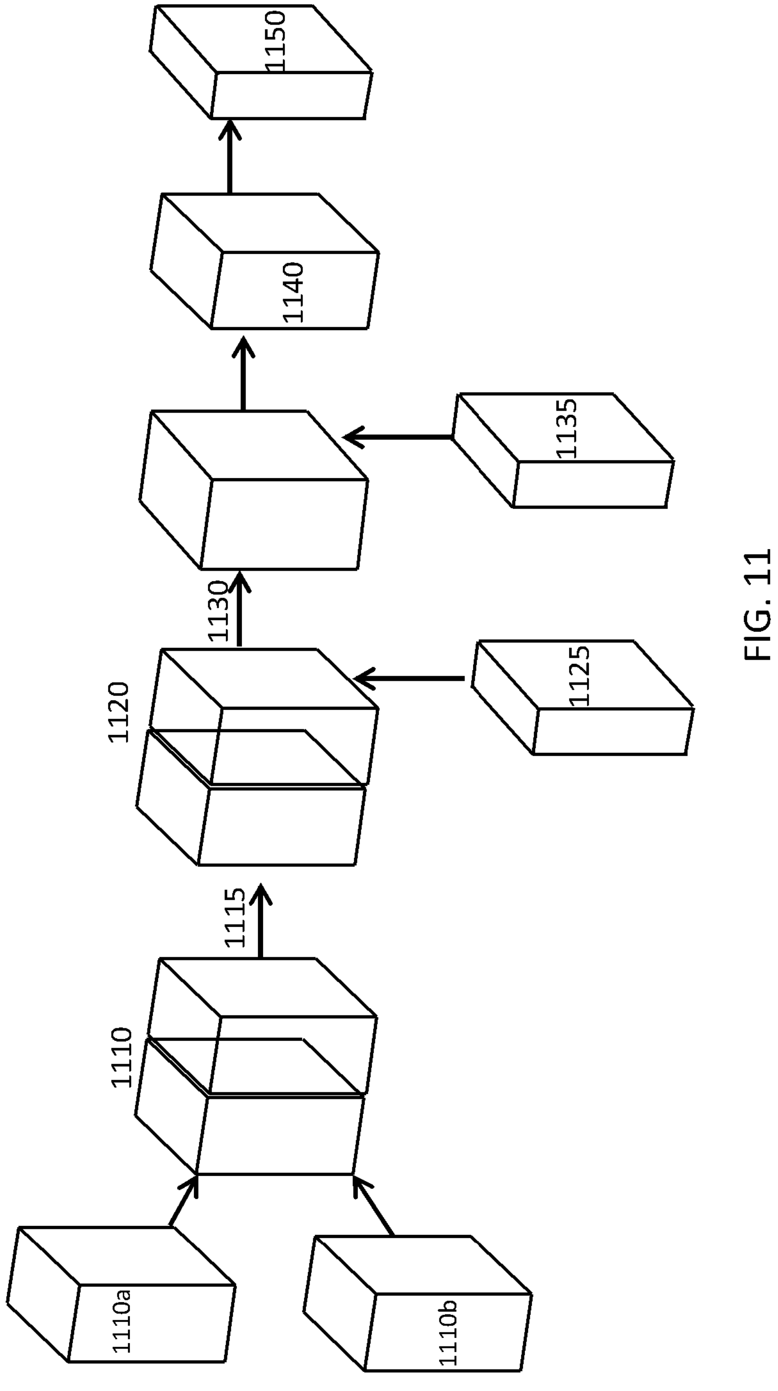
FIG. 11 shows a visual flow diagram showing a process for inferring using an AIML according to exemplary embodiments of the present disclosure.

FIG. 11 shows a visual flow diagram showing a process for inferring using an AIML described herein.

A channel matrix (obtained from UEs) is processed. The channel matrix includes a real 1110*a* and an imaginary part 1110*b*. The trained RL agent (AIML) performs convolution operations at 1115 to obtain a modified channel matrix 1120.

After several convolution dimensionality reduction operations at 1115, the MU-CQI 1125 is fused at 1130 and this fused at 1140 with the historical throughput 1135 to produce a modified channel matrix 1140. From this modified channel matrix, a scoring or score ratings of all users (UEs) is obtained. This scoring table can be used in the real-time wireless protocol stack to assign UEs to radio resources.

Fuse or fusing is a mathematically method, which is to mix and compress information without loss of information. The procedure is completed by convolution. By controlling the size of kernel core size, the number of matrix dimension could be reduced. Fusing can be demonstrated at: (see e.g., https://github.com/vdumoulin/conv_arithmetic/blob/master/README.md).

In embodiments described herein training may include using historical or data calculated from a communication or base station. The data may include a score rating for each of the group of UEs, channel matrix for each of the group of UEs, and transmission throughput for each of the group of UEs.

After getting the best trained model in term of wireless performance, then this model will be deployed in the real-time wireless protocol stack. DDPG algorithm module obtains the input needed from the real-time protocol stack, and then give the schedulable user set through AIML inference part.

When the channel conditions of users change, the new real-time data will be collected. Along with the historical data, the offline trained model will be reestablished, so that DDPG user selection model can be applied to the current cell scheduling scenario.

Figure 12:
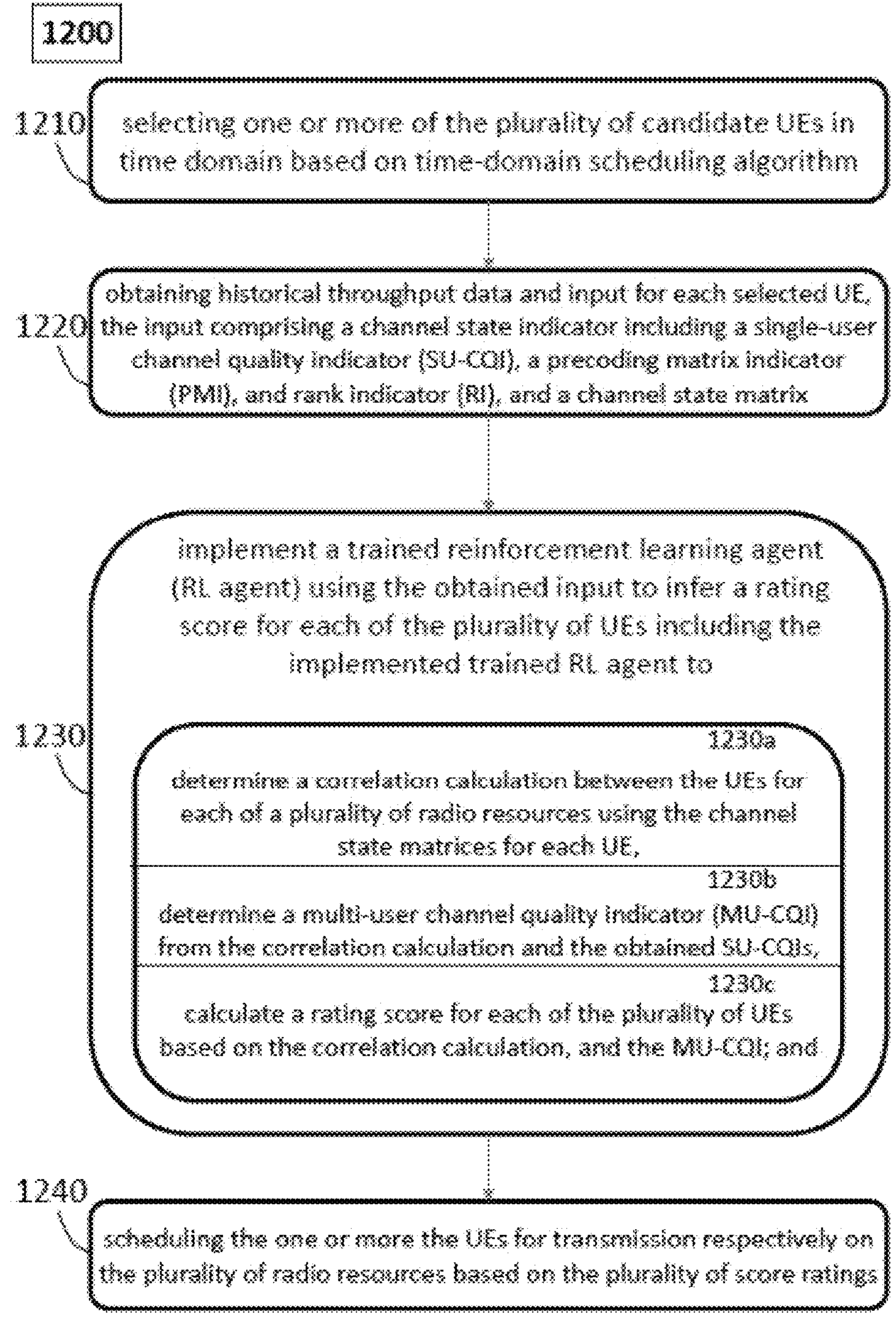
FIG. 12 shows a method 1200 for performing a user election for MU-MIMO according to embodiments herein.

FIG. 12 shows a method 1200 for performing a user election for MU-MIMO according to embodiments herein. The process or method 1200 may be performed by processing circuitry of a communication or base station that can implement (5G) MU-MIMO. The processing circuitry can be coupled to wireless or RF interface of the communication/base station.

In one example, the method 100 in the form of computer or program instructions stored on a non-transitory computer readable medium that when executed by at least one processor (e.g., processing circuitry) of a communication or base station cause the at least one processor to implement the process.

In particular, the method includes selecting one or more of the plurality of candidate UEs in time domain based on time-domain scheduling algorithm at 1210. At 1220, the method 1200 includes, at 1220 obtaining historical throughput data and input for each selected UE, the input comprising a channel state indicator including a single-user channel quality indicator (SU-CQI), a precoding matrix indicator (PMI), and rank indicator (RI), and a channel state matrix.

At 1230, the method 1200 further includes implementing a trained reinforcement learning agent (RL agent) using the obtained input to infer a rating score for each of the plurality of UEs includes the implemented trained RL agent to:

determine a correlation calculation between the UEs for each of a plurality of radio resources using the channel state matrices for each UE, (1230*a*)

determine a multi-user channel quality indicator (MU-CQI) from the correlation calculation and the obtained SU-CQIs, (1230*b*)

calculate a rating score for each of the plurality of UEs based on the correlation calculation, and the MU-CQI (1230*c*).

At 1240, the method 1200 includes scheduling the one or more the UEs for transmission respectively on the plurality of radio resources based on the plurality of score ratings and allocate the plurality of radio resources and.

In the following, various aspects of the present disclosure will be illustrated in the following examples:

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

The invention claimed is:

1. An apparatus for a communication station configured to provide multi-user multiple-input multiple output (MU-MIMO) service, the apparatus comprising:

processing circuitry, wherein to perform a multi-user selection for data transmission on a shared radio resource from a plurality of User Equipments (UEs), each of the UEs including a 5G new radio (NR), the processing circuitry is to:

select one or more of the plurality of candidate UEs in time domain based on time-domain scheduling algorithm, obtain historical throughput data and input for each selected UE, the input comprising a channel state indicator including a single-user channel quality indicator (SU-CQI), a precoding matrix indicator (PMI), and rank indicator (RI), and a channel state matrix, implement a trained reinforcement learning agent (RL agent) using the obtained input to infer a rating score for each of the plurality of UEs comprising the implemented trained RL agent to:

determine a correlation calculation between the UEs for each of a plurality of radio resources using the channel state matrices for each UE, determine a multi-user channel quality indicator (MU-CQI) from the correlation calculation and the obtained SU-CQIs, calculate a rating score for each of the plurality of UEs based on the correlation calculation, and the MU-CQI; and schedule the one or more the UEs for transmission respectively on the plurality of radio resources based on the plurality of score ratings and allocate the plurality of radio resources.

2. The apparatus of claim 1, wherein to schedule the one or more UEs for transmission comprises the processing circuitry to check whether each of the plurality of UEs has a score rating greater or equal to a threshold and schedule each of the UEs having a score rating greater or equal to the threshold to the plurality of radio resources, and wherein the processing circuitry is configured to, for each UE having a score rating that is less than the threshold, not schedule the UE having the score rating that is less than the threshold to a radio resource and set the score rating that is less than the threshold to zero.

3. The apparatus of claim 1, wherein the processing circuitry is further configured to reset the score rating of each scheduled UE after the resource allocation.

4. The apparatus of claim 1, wherein the processing circuitry is configured to determine the RL Agent award for each scheduling per Transmission Time Interval (TTI).

5. The apparatus of claim 1, wherein the trained RL agent implements a Deep Deterministic Policy Gradient (DDPG) type algorithm.

6. The apparatus of claim 1, wherein to determine the MU-CQI from the correlation calculation and the obtained SU-CQIs comprises to determine according to the formula:

$$MU_{CQI} = \frac{1}{M} * \frac{1}{\frac{1}{su_{CQI}} + \max \vartheta_{i,j}^2}$$

where M is a total number of selectable UEs, where $$\max \vartheta_{i,j}^2$$

is the maximum value or correlation weight between a UE i and all the other UEs (UE j).

7. The apparatus of claim 1, wherein the apparatus comprises a wireless protocol stack.

8. The apparatus of claim 1, wherein the processing circuitry is configured to implement the RL Agent so as to infer the user selection in real-time.

9. The apparatus of claim 1, wherein to determine the correlation calculation between the UEs for each of a plurality of radio resources comprises the RL agent to perform one or more convolution operations on the channel matrix.

10. The apparatus of claim 1, wherein the processing circuitry is further configured to schedule the one or more the UEs for transmission together at one time.

11. The apparatus of claim 1, wherein to schedule the one or more UEs for transmission comprises to schedule the one or more UEs to a same radio resource based on the score ratings comprising to:

determine a MU-MIMO gain for each UE after adding a subsequent UE to the same sub-band, if the MU-MIMO gain decreases after the subsequent UE is added to a same sub-band remove or re-schedule the subsequently added UE.

12. The apparatus of claim 1, wherein the processing circuitry is further configured to determine a transmission throughput and fairness indicator based on transmission from the one or more scheduled UEs.

13. The apparatus of claim 12, wherein the processing circuitry is further configured to provide the transmission throughput and fairness indicator as feedback to the trained RL agent.

14. The apparatus of claim 1, wherein trained RL agent comprises a trained artificial neural network comprising: a plurality of interconnected neurons arranged in a plurality of layers, the plurality of interconnected neurons connected by a plurality of connections, the connections each including an associated weight, the weights determined by a training of the and the trained RL agent configured to provide outputs from the neurons indicating correlation calculation, the MU-CQI, and the score ratings for UEs.

15. The apparatus of claim 1, wherein the trained RL agent includes adjustable weights selected to determining in a direction of a maximum value of a reward wherein the trained RL agent is trained with a data set comprising a SU-CQIs for each of a group UEs, a score rating for each of the group of UEs, a channel matrix for each of the group of UEs, a transmission throughput for each of the group of UEs, wherein during training of the trained RL agent a correlation for each of a plurality of radio resources is determined from the channel matrix, and a MU-CQI is determined from the SU-CQIs, and wherein the determined MU-CQI and throughput are multiplied by score ratings respectively producing a filtered MU-CQI and filtered throughput, wherein the filtered MU-CQI and the filtered throughput are respectively input through a neural network, each neural network comprising an activation layer configured to normalize the filtered MU-CQI and the filtered throughput value, and wherein weights a,b are respectively selected for the normalized MU-CQI and the normalized throughput so that the weights satisfy:

$$a+b=1 \text{ or } 100\%, \text{ and}$$

$$a*\text{normalized } MU\text{-}CQI + b*\text{normalized throughput} = \text{reward}.$$

16. The apparatus of claim 15, wherein the correlation is determined by multiplying a processed version of the channel matrix by a transpose of the processed channel matrix, wherein correlation matrix comprises elements representing the correlation weight between a UE i and all the other UEs, which is $$\max \vartheta_{i,j}^2.$$

(UE j).

17. The apparatus of claim 1, wherein the communication station comprises a gNB node.

18. The apparatus of claim 1, wherein the base station comprises an electronic database comprising historical throughput data for UEs serviced by the base station, and wherein the processing circuitry to obtain historical throughput data comprises the processing circuitry to obtain the historical throughput data from the electronic database.

19. A method for performing user selection in a base station using multi-user multiple-input multiple output (MU-MIMO) service, the method comprising:

selecting one or more of the plurality of candidate UEs in time domain based on time-domain scheduling algorithm, obtaining historical throughput data and input for each selected UE, the input comprising a channel state indicator including a single-user channel quality indicator (SU-CQI), a precoding matrix indicator (PMI), and rank indicator (RI), and a channel state matrix, implementing a trained reinforcement learning agent (RL agent) using the obtained input to infer a rating score for each of the plurality of UEs comprising the implemented trained RL agent to:

determine a correlation calculation between the UEs for each of a plurality of radio resources using the channel state matrices for each UE, determine a multi-user channel quality indicator (MU-CQI) from the correlation calculation and the obtained SU-CQIs, calculate a rating score for each of the plurality of UEs based on the correlation calculation, and the MU-CQI; and scheduling the one or more the UEs for transmission respectively on the plurality of radio resources based on the plurality of score ratings and allocate the plurality of radio resources.

* * * * *